April 28, 1931.  G. E. GRIMM  1,803,013
STEERING COLUMN PACKING
Filed May 31, 1927
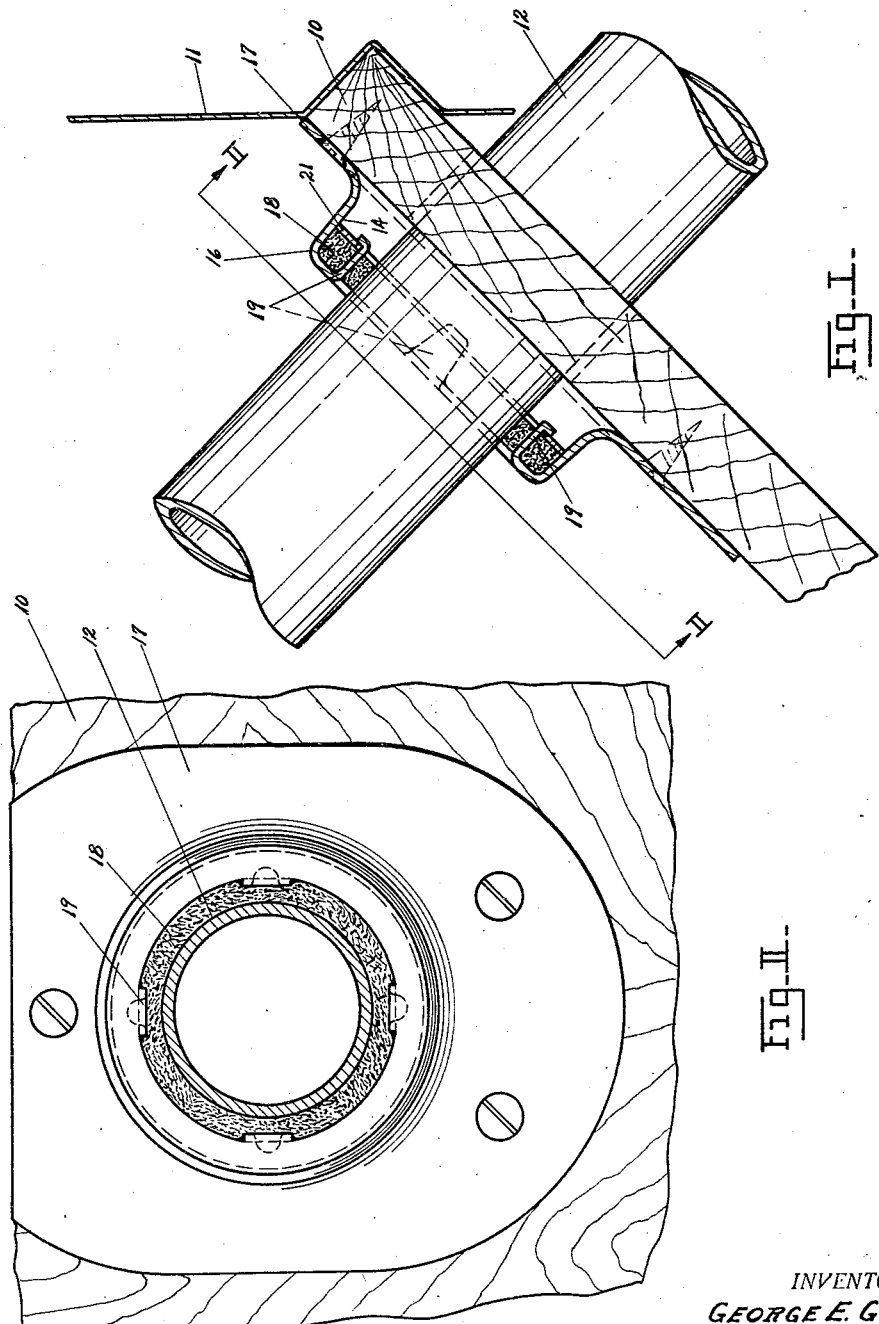
INVENTOR.
GEORGE E. GRIMM.
BY Chester H. Braselton
ATTORNEY.

Patented Apr. 28, 1931

1,803,013

UNITED STATES PATENT OFFICE

GEORGE E. GRIMM, OF TOLEDO, OHIO, ASSIGNOR TO THE WILLYS-OVERLAND COMPANY, OF TOLEDO, OHIO, A CORPORATION OF OHIO

STEERING-COLUMN PACKING

Application filed May 31, 1927. Serial No. 195,245.

My invention relates to the body construction of automobiles and has particular relation to the construction of the toe board through which the steering column extends.

One of the objects of the invention is to provide a gasket adjacent the floor board and enclosing the steering column, which will prevent the passage of dust and dirt into the body of the car.

Another object of the invention is to provide a gasket for enclosing the steering column which is adapted to absorb or deaden metallic sounds resulting from the vibration imparted to the column.

Another object of the invention is to provide a gasket retainer which is easily assembled and which will preserve the shape and life of the vibration absorbing member.

In order to prevent the passage of dust laden air from within the hood of an automobile into the body portion, it has been the practice to enclose the portion of the steering column adjoining the toe board with various matting materials. For the most part, however, these have been unsatisfactory by reason of their unstable and otherwise readily distorted character as well as their inability to withstand the conditions to which the members were subjected. According to my invention, I have provided a casing which is peculiarly adapted to retain a non-metallic member for an indefinite period in a preserved state. The construction is further characterized by the fact that the non-metallic member is relatively stiff and engages the steering column securely thereby absorbing or deadening the vibration and rattle to which this member is subjected.

The drawings illustrate an embodiment of the invention which may be preferred.

Figure I is an elevational view partly in section, illustrating the relation of the steering column and floor board to the gasket, and Fig. II is a sectional view taken along the line II—II of Fig. I.

Numeral 10 indicates a floor board of an automobile which may be supported in the conventional manner. A dash member 11 is disposed adjacent thereto and extends vertically to the cowl portion (not shown). Projected through the floor board is a steering column 12 which may be supported in any desired manner. In order to prevent the circulation of air through the unoccupied space in the floor adjacent the steering column, a gasket retainer is provided which includes a metallic ring member 14 having a shoulder portion 16 and a flanged portion 17. The flange may be screwed to the floor board or secured thereto in any other desired manner. Within the ring member and abutted against the shoulder portion thereof, a ring-shaped nonmetallic vibration absorbing medium 18 such for example, as felt, is disposed, which encircles about the steering column and engages the same securely. The periphery of the ring members includes a plurality of tongue portions 19 which penetrate the felt and are bent to enclose about an annular metallic member 21 of greater internal diameter than that of the vibration absorbing element.

It is convenient in assembling the unit to insert the felt member within the ring substantially as illustrated. Subsequently, the metallic washer is positioned whereby the fibrous element is compressed firmly and the tips of the tongue members are bent about the edge of the washer to secure the elements permanently. It will be observed that the ring member prevents the fibrous member from bulging outwardly. Furthermore, the tongue portions maintain the position of the fibrous washer as well as the metallic washer which cooperates with the shouldered portion of the ring to prevent expansion of the washer.

It will be observed that the invention provides an inexpensive, easily assembled combination of elements which afford complete protection from dust or dirt that is normally carried into the body of the automobile. It will also be observed that the combination restricts the direction of expansion of the fibrous element, maintains the shape thereof indefinitely, and absorbs the vibration of the column.

Although there is illustrated but a single embodiment of the invention, it will be understood that the principles may be embraced in many modifications and I desire therefore, that the invention be limited only as indicated in the appended claims.

I claim:

1. The combination of a floor board, a steering column passing therethrough, a shouldered ring surrounding the column and provided with a flanged portion secured to the board, a non-metallic flexible gasket retained within the shouldered ring, and in engagement with the column, and means integral with the shouldered ring penetrating the non-metallic member and permanently securing the same.

2. The combination of a floor board, a steering column, a shouldered metallic ring member disposed about the column adjacent the floor board, a non-metallic flexible washer engageable with the column and retained within the shouldered ring, a metallic washer member of greater internal diameter than the flexible washer disposed in engagement with the flexible washer, and means integral with one of the metallic members for permanently clamping the flexible and metallic members together.

3. The combination of a floor board, a steering column, a shouldered metallic ring member disposed about the column and secured to the floor board, a non-metallic flexible washer engageable with the column and retained within the shouldered portion, a metallic washer member of greater internal diameter than the flexible washer disposed in engagement with the flexible washer and a plurality of tongue members formed integrally with one of the metallic members, said tongue members being adapted to penetrate the flexible member and to be secured to the other metallic member.

4. In combination with a floor board of an automobile having an opening therein and a steering column projecting therethrough, a plate secured to said floor board, an integral cylindrical portion rising from said plate and encircling said steering column, said cylindrical portion terminating in an inwardly extending annular flange, a non-metallic packing member held in said cylindrical portion above said floor board and in engagement with said steering column and said flange, and locking tongues of said flange projecting through said packing member.

5. In combination with a floor board of an automobile having an opening therein and a steering column projecting therethrough, a plate secured to said floor board, an integral cylindrical portion rising from said plate and encircling said steering column, said cylindrical portion terminating in an inwardly projecting annular flange, a non-metallic packing member spaced from said floor board and held in engagement with said cylindrical portion, said flange and said steering column, and integral tongues on said flange projecting downwardly parallel to the steering column having their lower ends turned parallel to the face of the packing member.

6. In combination with a floor board of an automobile having a steering column projecting therethrough, a plate secured to a surface of said floor board, an integral cylindrical portion extending from said plate and surrounding said steering column, a non-metallic annular gasket within said cylindrical portion spaced from said floor board and in engagement with said steering column, a metallic member having slots beneath said gasket, and tongues integral with said cylindrical portion projecting through said gasket and slots having their lower ends turned into engagement with the face of the annular member.

In testimony whereof, I affix my signature.

GEORGE E. GRIMM.